United States Patent [19]
Esu

[11] Patent Number: 5,731,081
[45] Date of Patent: Mar. 24, 1998

[54] GLASS FIBER EVAPORATIVE COOLER MEDIA WITH MELAMINE FORMALDEHYDE BINDER

[75] Inventor: Esu S. Esu, Potomac, Md.

[73] Assignee: Hollinee Corporation, Broad Axe, Pa.

[21] Appl. No.: 340,404

[22] Filed: Nov. 15, 1994

Related U.S. Application Data

[60] Continuation-in-part of Ser. No. 223,423, Apr. 5, 1994, Pat. No. 5,511,598, which is a division of Ser. No. 72,697, Jun. 7, 1993, Pat. No. 5,340,651, which is a continuation of Ser. No. 777,145, Oct. 16, 1991, abandoned.

[51] Int. Cl.$^6$ ........................................ D02G 3/00
[52] U.S. Cl. .................. 428/375; 525/162; 525/163; 524/512
[58] Field of Search ........................ 525/162, 163; 524/512; 428/375, 392

[56] References Cited

U.S. PATENT DOCUMENTS

| | | | |
|---|---|---|---|
| 3,669,638 | 6/1972 | Wong et al. | 65/3 |
| 3,854,267 | 12/1974 | Weiant et al. | 524/494 |
| 3,895,134 | 7/1975 | Kigane et al. | 427/246 |
| 3,917,555 | 11/1975 | Worschech et al. | 524/294 |
| 3,996,177 | 12/1976 | Ludwig | 525/163 |
| 4,039,493 | 8/1977 | Schön et al. | 525/163 |
| 4,258,098 | 3/1981 | Bondac et al. | 428/288 |
| 4,264,671 | 4/1981 | Gillern et al. | 428/302 |
| 4,295,871 | 10/1981 | Droux et al. | 65/3.41 |
| 4,304,711 | 12/1981 | Smith | 524/159 |
| 4,560,612 | 12/1985 | Yau | 428/288 |
| 4,781,987 | 11/1988 | Bolgiano et al. | 428/480 |
| 4,789,707 | 12/1988 | Nishimura et al. | 525/162 |
| 4,812,506 | 3/1989 | Gilmer et al. | 524/512 |
| 4,904,522 | 2/1990 | Markusch | 428/288 |
| 5,340,651 | 8/1994 | Esu | 428/375 |
| 5,346,541 | 9/1994 | Goldman et al. | 106/163.1 |

*Primary Examiner*—Patrick Ryan
*Assistant Examiner*—J. M. Gray
*Attorney, Agent, or Firm*—Reid & Priest, L.L.P.

[57] ABSTRACT

Glass fiber evaporative cooler media are provided having melamine-formadehyde resin binders coated on the glass fiber. These melamine-formaldehyde coated glass fibers provide evaporative cooler pads with increased capallarity or surface sheeting characteristics while simulataneously demonstrating increased water resistance or hydrophobicity. The melamine-formaldehyde resins of the present invention furthermore provide coatings having greater resistance to thermomigration of binder during drawing. The melamine-formaldehyde binders of the present invention are of three types based upon the resins used: 1) melamine-formaldehyde/urea-formaldehyde; 2) melamine-formaldehyde only; and 3) melamine-formaldehyde/polyurethane.

8 Claims, 1 Drawing Sheet

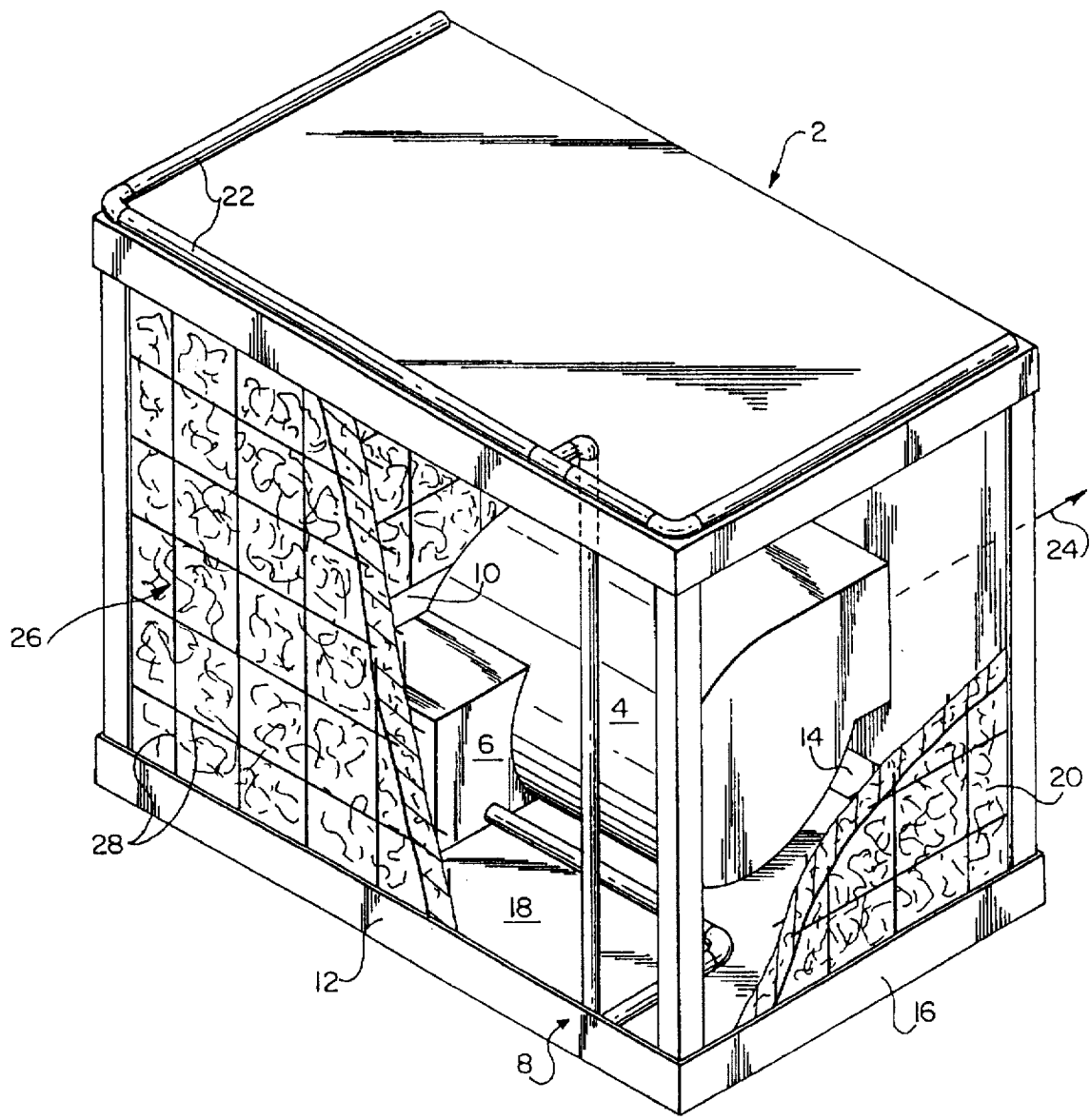

GLASS FIBER EVAPORATIVE COOLER MEDIA WITH MELAMINE FORMALDEHYDE BINDER

CROSS REFERENCE TO RELATED APPLICATIONS

This is a Continuation-in-Part Application of U.S. application Ser. No. 08/223,423 filed Apr. 5, 1994, now U.S. Pat. No. 5,811,598 which is a divisional application of U.S. application Ser. No. 08/072,697, filed Jun. 7, 1993, (now U.S. Pat. No. 5,340,651) which is a continuation application of U.S. application Ser. No. 07/777,145, filed Oct. 16, 1991 (abandoned).

FIELD OF THE INVENTION

This invention relates generally to evaporative cooler media, methods of forming and using same in an evaporative cooling method and an evaporative cooler apparatus. It relates more particularly to high loft, dimensionally stable glass fiber cooling media formed of glass fiber coated with a hydrophilic coating.

BACKGROUND OF THE INVENTION

Evaporative cooler media utilize liquid evaporation to cool air by contacting warm air with a liquid, such as water, causing the liquid to evaporate, thereby cooling the air. Evaporative cooler media are especially useful in arid areas having high temperatures and low humidities. Typical evaporative cooling systems include a high volume blower and at least one cooler pad supplied with water. The pads are porous to allow air to flow through, and water is adsorbed by the pads or distributed on the pads to increase the surface area available for evaporation, with the blower blowing warm air through the pad to cool the air.

Various materials have been used in the prior art to form the cooler pads used in evaporative coolers. For example, Baigas, Jr., in U.S. Pat. No. 4,556,521, discloses a high loft batt (pad) of hydrophobic textile fibers such as polyester fibers, which are prebonded together and then coated with a preformed hydrophilic foam, which coats the bonded synthetic fibers and bridges and spans random portions of the interstices and passageways of the batt to increase the available surface area for contact by water. Preferred foams are formed of vinyl acetate homopolymers and/or polymeric acrylic emulsions.

Hobbs, in U.S. Pat. No. 4,902,449, forms an evaporative cooler pad from natural cellulosic light weight elongate segments, such as aspen wood shavings, which are oriented in generally horizontal planes which extend substantially parallel to the opposing faces of the pad. The cellulosic segments are coated with a hydrophilic foam to provide a coating thickness substantially less than the thickness of the elongate segments. The hydrophilic foam coating and surface has a minute cellular structure which produces a capillary type effect when contacted with water to whisk the water through the pad. All patents and other printed materials referred to herein are incorporated by reference as if reproduced in full hereinbelow. All information concerning chemicals used herein, trademarked or otherwise, is also incorporated by reference, such as but not limited to Material Safety Data sheets discussing any chemicals mentioned herein. Generally, evaporative cooler apparatus include an enclosure or housing in which an evaporative cooler pad is positioned so that water can be fed to the pad and air from a blower, located inside or adjacent to the enclosure, can be blown through the pad, thus cooling the air.

Unfortunately, prior art evaporative cooler media and evaporative cooler apparatus using the prior art media suffer from numerous deficiencies. For example, polyester fiber pads, which are formed of fibers coated with a hydrophilic coating, have too low a porosity and rapidly become clogged with dirt. Further, the polyester pads do not have sufficient dimensional stability or rigidity, and hence need greater reinforcement, such as by use of a reinforcement grid in the evaporative cooler apparatus housing. After several months of contact with water, the polyester fiber pads degenerate, and water causes them to collapse under their own weight. Prior art evaporative cooling pads formed from wood shavings also suffer from bacterial and fungal growth due to microorganisms carried by air circulated through the pads, which results in the pads giving off objectionable odors. Bacterial action also degrades the organic matter, causing the pads to sag, thus losing the desired porosity for air passage, and reducing the surface area available for evaporation.

As the porosity of evaporative cooler pads decreases or as cooler pads become clogged in evaporative coolers, greater strain is placed on the blowers that draw or blow air through the cooler media. This results in increased energy consumption, increased wear on the blowers and more frequent replacement of blowers. Therefore, there is a need for an improved evaporative cooling media having improved dimensional stability, high porosity, and high capillarity.

The term "capillarity" is used here in its conventional sense (see Hawley's Condensed Chemical Dictionary, 11th edn., 1987), and, more particularly, to refer to the tendency of a solid to promote uniform coating or sheeting of the surface of the solid by a liquid without absorption of the liquid into the solid.

The media should be resistant to bacterial or fungal decay and produced at a cost comparable to conventional evaporative cooler media. There is also a need for an improved evaporative cooler apparatus utilizing such an improved cooler media, so that the apparatus will last longer and be more efficient in cooling, and yet require less frequent pad replacement.

To overcome some of these shortcomings, attempts were made to produce evaporative cooler media from inert inorganic or mineral fibers, such as those made of silica. In particular, attempts were undertaken to form evaporative cooler media from fiber glass. Fiber glass mats are produced by melting glass to form long thin fibers and then winding of the fibers on a drum to form a mat. (This is known as hot melt spinning.) The mats are subsequently pulled or drawn to expand the mats into porous pads. Since prior art cooler pads had been produced by coating polyester fibers with an acrylic emulsion (otherwise known as an acrylic, acrylic polymer mixture, acrylic polymer blend, acrylic latex, latex, or acrylic resin), glass fibers were coated with an acrylic resin in an attempt to produce a hydrophilic, porous, glass fiber cooler media. However, the acrylic resin coating jelled onto the fibers in the glass fiber mat, and the glass fiber mats would not expand well into a pad (hence the resulting pads had zero or almost zero porosity).

Porous glass fiber pads are known and have been used as air filters. In order to form expanded, dimensionally stable high loft fiber glass pads from mats, the glass fibers are coated with a binder during spinning, such as a urea-formaldehyde blend (otherwise known as urea-formaldehyde copolymer, UF, or urea-formaldehyde). However, binders such as urea-formaldehyde copolymers degrade in water. Hence, such urea-formaldehyde bonded pads could not be used as evaporative cooler media since the water rapidly degrades the urea-formaldehyde that binds the fibers in a 3-dimensional porous matrix. Thus, early experiments failed to produce a hydrophilic glass fiber or hydrophilic glass fiber pads. (See U.S. Pat. No. 4,904,522 for binding of glass fiber mats with aqueous polyisocyanate emulsions.) Nevertheless, if a hydrophilic coating for glass fiber could be produced and such coated glass fiber formed into a dimensionally stable porous pad, such pads would be highly useful in evaporative coolers and for other filtration purposes.

Therefore, it is a primary object of the present invention to produce a dimensionally stable porous glass fiber pad having high capillarity.

It is another object of the present invention to provide an evaporative cooler apparatus utilizing a hydrophilic glass fiber cooling media.

SUMMARY OF THE INVENTION

These and other objects of the present invention are achieved in a preferred embodiment by coating glass fiber with a urea-formaldehyde/acrylic polymer blend. Other preferred embodiments are achieved by coating glass fiber with a urea-formaldehyde/melamine formaldehyde polymer blend or with a melamine formaldehyde/polyurethane polymer blend.

The glass fiber is first spun into a mat of intersecting glass fibers on a drum. Simultaneously, the resin binder formulations of the present invention are applied to bind the glass fibers together in a mat. After forming, the mat is pulled to add loft, thereby forming a porous pad. The pulled (expanded) mats, or "pads," are then optionally coated with another polymer blend, and cured to form a dimensionally stable, porous, glass fiber pad having high capillarity. (Note that for the purposes of this application, the term pad will refer to the expanded porous structure formed by pulling mats of woven glass fiber.) These pads are known in the art as "Evaporative Cooler Pads" or "ECPs".

ECPs are used in evaporative cooler apparatus. An evaporative cooler apparatus is constructed with a housing, an ECP, a blower, and means for providing water to at least one ECP in the housing. The housing or enclosure is designed so that air can either be drawn through or blown through the evaporative cooler pads. The coating on the glass fibers improves wetting of the fibers and thereby increases the surface area from which water can evaporate, which, in turn, increases the cooling capacity of the pad. Furthermore, since the glass fiber pads are highly porous and have improved dimensional stability, there is less resistance to air flow through the pad than with prior art cooler pads. This provides an evaporative cooler apparatus that requires less frequent pad replacement and causes lower wear or stress on the blower.

BRIEF DESCRIPTION OF THE DRAWINGS

FIG. 1 is a perspective view of an evaporative cooler apparatus utilizing a porous, glass fiber evaporative cooler pad produced in accordance with the present invention.

DETAILED DESCRIPTION OF THE PREFERRED EMBODIMENTS

With reference to FIG. 1, the general design of an evaporative cooler apparatus is presented. An enclosure or housing 2 contains a blower 4, which can be driven by an electric motor located inside of enclosure 2, or which can be driven by a belt operated by mechanical, electrical, or other means located outside of housing 2. A pump 6 is also optionally located inside enclosure 2 to supply water to well 8 formed in the bottom of enclosure 2 by short sidewalls 10, 12, 14, 16, and bottom 18. In the alternative, water or another evaporative fluid can be supplied to well 8 via any suitable means. Pads 20 are situated in housing 2 so that water in well 8 will contact the pads and the pads will wick water out of the reservoir 8. Preferably, water is also allowed to flow through the pads via pipes 22 situated above the tops of the pads, which have perforations along the bottom surface to allow water to drain into/onto pads 20. If blower 4 is operated to draw air into housing 2, a concentrated stream of cooler air, represented by arrow 24, will be produced. If air is blown into enclosure 2, a dispersed stream of cooler air will exit through the pads 20 resting in the walls of enclosure 2.

A conventional grid 26, preferably formed of a material resistant to water, is provided to reinforce the cooler pads and prevent their buckling or collapsing toward the interior or exterior of enclosure 2 upon operation of blower 4. Note that pads 20 can be loosely rested in housing 2, or retained by any conventional means. Due to the improved dimensional stability of the pads produced in accordance with the present invention, grid 26 can have the number of reinforcement structures 28 reduced and, in some cases, grid 26 can be dispensed with entirely, thus resulting in substantial cost savings and effort in producing the apparatus.

A preferred non-limiting embodiment of a coated glass fiber and porous, coated glass fiber evaporative cooler pad follows. Glass fiber is produced by melting glass and spinning the glass to produce a glass fiber (or fiber glass) mat following conventional glass fiber spinning techniques. During spinning of the glass mat, the fibers are sprayed with a binding mixture. The drums upon which the glass fibers are spun are preferably covered with cellophane prior to spinning the glass fibers onto the drum. After hot melt spinning of glass fibers onto the drums, the glass fiber-coated drums are covered with cellophane, and the glass fiber webs on the drums are cut in a direction parallel with the axis of each drum. This produces rectangular or square glass fiber mats or sheets.

Each mat is mechanically manipulated or pulled to add loft. This results in an expansion of the mat into a three-dimensional hexahedron. The pads are then optionally coated with another binder, then heated to cure the binder mating(s) resulting in a dimensionally stable, porous pad having a resin coating that improves wetting of the fibers. With the exception of its poor capillarity or surface sheeting characteristics, fiber glass appears to be an ideal media for air filtration pads or cooling media pads in evaporative coolers since the fibers have no appreciable water solubility and have high rigidity. The high rigidity enables highly porous, yet dimensionally stable pads to be formed.

Glass to produce the glass pads can be obtained from a variety of sources, including recycled glass, and scrap glass from a variety of manufacturers.

A. Urea-Formaldehyde Acrylic Binders

Suitable acrylic resins can be obtained from Rohm and Haas Specialty Industrial Polymers of Edison, N.J., 08837, and are sold under the designation ROPLEX GL-618 and TR-407. Similar acrylic polymer resin products can also be purchased from Air Products and Chemicals, Allentown, Pa. 18195, such as the resin sold under the trade name FLEX-BOND 984 EMULSION, or a suitable acrylic resin can be purchased from BF Goodrich, Specialty Polymers and Chemicals Division, Rexville, Ohio 44141. Other sources of acrylic resins or emulsions can be used, or one of skill in the art may produce their own formulation, provided the necessary degree of hydrophilicity can be produced in the glass fiber pads without interfering with the dimensional stability of the pads (i.e., the hydrophilic coating/binder should have high wet strength).

A suitable urea-formaldehyde resin or co-polymer blend can be obtained from Seaco (Southeastern Adhesive Company) of Ridgewell, Va., designated resin product 4067.1. The preceding materials and suppliers are merely preferred, and other suppliers and equivalent ingredients may be used in performing the invention.

Due to the failure of early experiments which attempted to apply an acrylic polymer coating to glass fibers and form an expanded hydrophilic pad, it was desirable to find a composition or combination of compositions which would (1) sufficiently bind glass fibers together to form a dimensionally stable porous fiber glass pad which could withstand degradation by contact with aqueous solutions, and (2) provide a suitable hydrophilic coating on the glass fibers to provide a large area for liquid air contact. Thus, experiments were performed in an attempt to formulate a suitable hydrophilic binder Composition, and to develop, a method of producing a hydrophilic coated glass fiber and a porous, dimensionally stable, hydrophilic glass fiber pad.

EXPERIMENT 1

A 50—50 mix of an acrylic polymer with a urea-formaldehyde co-polymer was applied to glass fibers during hot melt spinning of the glass fibers onto a drum covered with cellophane. The spun mat of intersecting glass fibers on the drum was subsequently covered with another sheet of cellophane, and the mat removed from the drum by cutting parallel to the axis of the drum. The mat was then pulled to create loft (and increase porosity), and the pad formed was conveyed at a rate of 110 feet per minute into a 110 foot long oven held at 460° F. (this gives about a 1 minute cure time). However, the pads stuck to the conveyer in the oven, and the resulting pad had poor loft (about 30% less loft than a comparable pad coated with just urea-formaldehyde as a binder). The resulting pad was also very stiff, having little resiliency, so upon compression the pad lost porosity. This is highly undesirable, since, for shipping purposes, it is preferred to compress the pads to a certain degree; prior to use, the pads should expand back to the same, or to almost the same, loft.

EXPERIMENT 2

Ten (10) grams ROPLEX TR-407 acrylic polymer emulsion and 40.0 grams urea-formaldehyde co-polymer blend wore well mixed in a beaker. The mixture was spread onto a watch glass, and air dried for 2 days. A portion of the blend was cured for 3 minutes at 300° F. A 0.83 gram sample of the cured film was then placed in a pre-weighed empty tea bag and introduced into a 180° F. water bath for 1 hour. The tea bag was then removed from the water bath and dried, and the weight of the 20:80 blend of acrylic urea-formaldehyde blend was measured. The sample lost 0.65 grams of the blend, equivalent to a weight loss of 78.3%.

A 30:70 blend of acrylic urea-formaldehyde blend was treated in a similar fashion, and showed a weight loss of 42.1%.

EXPERIMENT 3

The following mixtures were formed:

| Ingredient | (Percentage by Weight) | | |
|---|---|---|---|
| | Sample 1 | Sample 2 | Sample 3 |
| Rohm and Haas ROPLEX TR-407 | 25% | 30% | 35% |
| Seaco Urea-formaldehyde resin | 75% | 70% | 65% |

The ingredients for each of the samples were combined in 50 ml beakers and magnetically stirred for about 30 minutes at room temperature to homogenize the solutions. After mixing, the solutions were smeared on aluminum pans, and air dried for 2 days. The films were cured at 400° F. for 3 minutes. Portions of the cured samples were then put into pre-weighed tea bags, soaked in 180° F. water for 1 hour, dried on paper towels, and oven dried (for about 2 hours). Sample 1 lost about 27.4% by weight, Sample 2 lost about 22.7% by weight, and Sample 3 lost about 11.3% by weight.

EXPERIMENT 4

The same procedure as Experiment 3 was followed, except that in place of Rohm and Haas ROPLEX TR-407 blend, Air Products Latex-984 blend was used as follows:

| Ingredient | (Percentage by Weight) | | |
|---|---|---|---|
| | Sample 4 | Sample 5 | Sample 6 |
| Air Products and Chemicals Latex-984 | 25% | 30% | 35% |
| Urea-formaldehyde | 75% | 70% | 65% |

Sample 4 lost about 31.2% by weight, Sample 5 lost 34.2% by weight, and Sample 3 lost 35.67% by weight.

EXPERIMENT 5

The procedure of Experiment 3 was followed, with Rohm and Haas ROPLEX TR-407 being replaced with ROPLEX GL-618 as

| Ingredient | (Percentage by Weight) | | |
|---|---|---|---|
| | Sample 7 | Sample 8 | Sample 9 |
| Rohm and Haas ROPLEX GL-618 | 25% | 30% | 35% |
| Urea-formaldehyde | 75% | 70% | 65% |

Sample 7 lost 19.2% by weight, Sample 8 lost 22.6% by weight, and Sample 9 lost 12.5% by weight.

From the foregoing experiments, it was clear that, by increasing the quantity of acrylic polymer resin or emulsion added to the urea-formaldehyde co-polymer resin blend, that decreased water solubility resulted. Preferred results were achieved using the ROPLEX TR-407 blended at 35% by weight to 65% by weight urea-formaldehyde (11.3% weight loss, or 88.7% durability). All of samples 1–9 showed significant durability, with a ratio of acrylic resin to urea-formaldehyde resin of 35/65 (35% acrylic resin to 65% urea-formaldehyde) having surprisingly good durability.

EXPERIMENT 6

A blend of 195 lbs urea-formaldehyde, "UF", and 105 lbs of ROPLEX GL-618 "latex" was formed. An analysis of the UF-latex blend showed it to have a viscosity of 160 cps, a gel time of 7–9.2 minutes, and a percent solids of 56–60%. Note that the viscosity may be adjusted to optimize application to the glass fiber, preferably by spraying. Adjustment of the viscosity and other properties of the acrylic/UF resin blend can be achieved by conventional techniques, such as adjustment of the solids content, addition of soaps such as but not limited to sodium laurel sulfate, wetting agents such as but not limited to that sold by American Cyanamid under the trade name DECERESOL OT, fillers such as clay, or foam stabilizers such as but not limited to ammonium stearate. The blend was then sprayed onto the glass fibers being wound onto a drum during hot melt spinning of a glass fiber mat. The mat was then cut off of the drum and pulled to expand its linear dimensions to approximately 40 times the original linear dimensions; the mat also vertically expanded to have increased loft.

The resulting pad was then fed to a 110 foot long oven at a speed of about 110 feet per minute. The oven was divided into first and second zones, with the first zone to which the mat was subjected being at 560° F. and the second zone being at 460° F. Mats of 2 inches through 4 inches in width (thickness or vertical height) were formed.

A second batch of latex/urea-formaldehyde blend was formed from 105 lbs ROPLEX TR-407 and 195 lbs of urea-formaldehyde blend from Seaco. The resulting porous pad had an open structure on both sides. It was necessary to optimize the amount of latex urea-formaldehyde binder sprayed onto the mat material in order to optimize porosity. Pads were produced to minimize unwanted skin on the surfaces of the pads (a skin forms when the outer most portions of the pad are compressed to a greater degree than the inner most portions of the pad).

A pad produced according to the present invention was then compared to a polyester pad coated with an acrylic-polymer-based hydrophilic coating, and the results are presented below:

| Test Conducted | Media Properties Analysis | | | |
| --- | --- | --- | --- | --- |
| | Fiber Glass | | Polyester | |
| | Dry | Wet | Dry | Wet |
| Air Flow Resistance (Pressure) 1000 CFM | 0.040 | 0.050 | 0.055 | 0.065 |
| Efficiency | | 77% | | 83% |
| Durability in 180° F. water | | 98% | | 98% |
| Water Retention | | >60% | | |
| Rate of Wetting by Water | 2 min/gal | | 3 min/gal | |
| Average Weight of 12 inch by 12 inch media | 25/5 | | | |
| Compression Recovery | 90% | | 70% | |
| Stiffness | V.high | | medium | |
| Porosity | 5–10μ | | 5–10μ | |

From the foregoing table it is clear that the hydrophilic fiber glass pads produced according to the present invention have excellent water wetting capabilities, improved stiffness in comparison to polyester pads, and excellent compression recovery. Of particular significance is that polyester media have a 30% greater air flow resistance when wet than the wet fiber glass media of the present invention. (For the purposes of this application, the term "coating formed of an amine-aldehyde blended with an acrylic," or the like can also be used to describe the cured coating, with it being understood that the cured coating may not contain any unreacted amine-aldehyde and/or acrylic.) Additional experiments found that pads bound with a mixture of 25% by weight GL-618 to 75% by weight urea-formaldehyde had a better compressibility, but less durability, when compared to a blend formed of 35% by weight ROPLEX TR-407 and 65% by weight urea-formaldehyde. However, the high recovery of both acrylic/UF coated pads is consistent with the physical properties of urea-formaldehyde resins, which have a modulus of elasticity of about 800 kg/mm$^2$ (in comparison to the modulus of elasticity for phenol formaldehyde blends of 250 kg/mm$^2$ and 900 kg/mm$^2$ for melamine-formaldehyde resins).

It is often helpful to produce mats of different color to distinguish mats having different properties or sources. This is accomplished by addition of dye to the binding/hydrophilic resin. In a preferred embodiment; dye compounds are combined with the urea-formaldehyde resin prior to mixing with the acrylic resin or emulsion composition.

In a preferred embodiment, following production of the fiber glass pad having a urea-formaldehyde/acrylic polymer binding/hydrophilic coating, the pad is then subjected to a second coating ("by foaming") with an acrylic or latex polymer and cured for additional hydrophilicity. The second coating with the additional hydrophilic coating is also believed to result in increased durability of the pad when in contact with water. Preferably, the second coating is cured at about 300° F. The resulting cooler media has great hydrophilicity, and has much larger porosity (a minimum average porosity of greater than 20 microns) than prior art polyester cooler pads (porosity less than or equal to 10 microns), and the hydrophilic glass fiber mats formed of the media are less susceptible to degradation and have greater dimensional stability than the prior art polyester mats. Conventional acrylic emulsion foaming procedures used with polyester pads can also be used with acrylic/urea-formaldehyde coated porous, glass fiber pads of the present invention. In a preferred embodiment the acrylic emulsion is modified to include wetting agents, soap (foam stabilizer), and other conventional additives which enhance the ability of the acrylic to be applied and to adhere to the pre-coated glass fiber. Note that these additional ingredients are optional and the determination of the amounts to add is well within the skill of one of ordinary skill in the art. A preferred nonlimiting example of a foaming mixture is formed of:

| Ingredient | Quantity | |
| --- | --- | --- |
| Water | 25 gal | |
| DECERESOL OT | 1.5 gal | foam stabilizer from American Cyanamid |
| TAMOL 850 | 2.1 qts | self-cross linking acrylic emulsion from Rohm & Haas |
| E-32 | 12.0 gal | acrylic emulsion with glass transition temperature of 0° rom Rohm & Haas; improves flexibility of resulting cured coating |
| A-18 | 3.0 qts | wetting agent and/or foam stabilizer from American Cyanamid |
| Siflo Clay | 2.0 bags (50 lbs each) | filler from Nord Terlite Company of Dayton, Ohio |
| Ammonium Stearate | 5.50 gal | foaming agent (soap) |
| TR-407 | 48 gal | acrylic emulsion from Rohm and Haas |

At present, the cost for urea-formaldehyde blends is approximately ⅓ to ¼ that of the cost of acrylic resin blends. Therefore, it is desired to maximize the utilization of urea-formaldehyde in comparison to the acrylic resin used, while at the same time using sufficient acrylic resin to ensure sufficient hydrophilicity and durability of the pads produced.

As the present invention pioneers the use of hydrophilic glass fibers, and hydrophilic glass fiber pads, especially for use in evaporative cooler apparatus, it is envisioned that a wide range of compounds can be used to produce the binding/hydrophilic coating on the glass fibers to ensure that the glass fibers are bound sufficiently to maintain the high dimensional stability of the glass fiber pads while having high hydrophilicity and good durability when in contact with water. For example, amine containing compounds other than urea can be combined with an aldehyde and an acrylic to produce a binder; non-limiting examples include melamine formaldehyde, and the urea-formaldehyde discussed above. It is also believed possible to utilize phenol-formaldehyde blends with acrylic resins. However, urea-formaldehyde is preferred since it decays to form amine salts, and certain insects are known to eat cured urea-formaldehyde blends with no harmful effects. On the other hand, phenol-formaldehyde copolymer blends are believed to be toxic in certain instances, as are melamine-formaldehyde blends.

Other contemplated equivalents to the urea-formaldehyde blend include modified isocyanate/dicarboxylic acid blends, or compounds capable of acting as binders and hydrophilic coatings in accordance with the objects of the invention, e.g., bind glass fibers into a stable 3-dimensional pad without interfering with the hydrophilicity of the resulting coating, and yet not rapidly degrade/dissolve when contacted with water.

Contemplated equivalents of the acrylic or latex blend encompass blends include any member of the acrylic acid family which is capable alone, or in combination with a synthetic or natural rubber compound, of having the necessary durability and hydrophilicity for effective use in glass fiber evaporative cooler media. Hence, amine-aldehyde refers to any blend of an amine containing monomer, oligomer, or polymer with an aldehyde containing monomer, oligomer or polymer. By members of the acrylic acid family, it is meant any alpha-beta unsaturated carboxylic acid or alpha-beta unsaturated ester, provided the composition will react alone (or when combined with another latex compound or a latex like compound) with an amine-aldehyde to form a dimensionally stable hydrophilic glass fiber media. Acrylic resins are also contemplated to include substances such as isoprene and other natural and/or synthetic latex like compounds provided they are hydrophilic, have good wet strength, and can adequately bind glass fibers when combined with an amine-aldehyde.

From the foregoing, it is clear that a preferred binder/hydrophilic blend can be formed of from between 5% and 50% of an acrylic (monomer, oligomer or polymer) combined with 50–95% of a urea-formaldehyde resin, to which can also be added dyes and other processing aids depending on the user requirements. In a preferred process, an amine-aldehyde acrylic resin blend is sprayed onto glass fiber and spun into a glass fiber mat by hot melt spinning. The resulting coated mats are then drawn to produce an expanded porous glass fiber pad, which is cured at temperatures between 250° F. and 600° F. Preferably, the curing is done in a two step process, with a first curing step performed at temperatures of approximately 415° F. for periods of time ranging from 15 seconds to 5 minutes, and a second curing step performed at temperatures of 515° F. for 15 seconds to 5 minutes. In the alternative, curing can occur at temperatures ranging between 460° F.–550° F. for a time ranging from 15 seconds to 5 minutes. Of course, longer or shorter curing times may be used at lower, higher, or equivalent temperatures, depending on the processing facilities available, the thickness of the mat, and the speed at which the mat is conveyed through an oven, and other process variables as would be obvious to one of skill in the art without requiring undue experimentation.

In a preferred embodiment, a porous fiber glass pad having a hydrophilic amine-aldehyde/acrylic coating produced in accordance with the present invention is cut to a size sufficient for placement inside of an evaporative cooler apparatus, such as that shown in FIG. 1. Due to the improved dimensional stability of the mat, the number of reinforcement structures in the grids may be reduced or eliminated entirely depending upon the size of the pad, and the operating conditions. An evaporative cooler apparatus constructed in accordance with the present invention will require less frequent replacement of the cooler pad(s) as a result of the improved dimensional stability of the glass fiber pads and decreased clogging of the pads due to the increased porosity. Further, blower motors will be subjected to less wear due to the decreased pressure drop through the glass fibers pads produced according to the present invention, thus extending blower life, or allowing for the use of less powerful and more energy efficient blowers. Although it is believed that the amine-aldehyde resin and the acrylic resin undergo cross-linking during curing to form a water-stable hydrophilic binder for the porous, glass fiber pads of the present invention, the invention is not to be limited by any particular theory or mechanism of operation for the hydrophilic coatings formed. If it is further contemplated that an equivalent process may involve application (e.g., by "foaming") of an acrylic emulsion to a porous glass fiber pad, bound or dimensionally stabilized by a conventional binder, such as a urea-formaldehyde resin, to form hydrophilic, dimensionally stable, porous glass fiber pads, although it is believed that such a process can not achieve the exact results possible following the preferred process.

II. Melamine-Formaldehyde Binders

In addition to the foregoing Urea-formaldehyde/Acrylic binders, additional binders incorporating substantial amounts of methylated melamine-formaldehyde resin have also proved to be highly effective binders.

These methylated melamine-formaldehyde containing binders eliminate the need for latex or acrylic components of the binder. This feature imparts certain advantages due to the recognized problems associated with the use of latex binders, e.g, thermomigration of binder during drying. See Smith, C. P., Tappi Journal, Vol. 76, No. 1, pp. 1830186 (1992).

Another advantage of the melamine-formaldehyde resins of the present invention is the retention of the high capillarity or surface sheeting characteristics of the coated glass fiber, but reduction of the absorption of water, which, over time, can lead to loss of coating, structural failure of the pad, and consequently sagging and reduced porosity. These problems are particularly acute in ECPs and such products that are continuously exposed to water for extended periods. Thus, these melamine-formaldehyde resins retain high capillarity or sheeting action on exposure to water, while simultaneously increasing hydrophobicity relative to the foregoing latex or acrylic containing binders.

Melamine-formaldehyde resins of the present invention are well known in the art. See, e.g., Stevens, M. P., *Polymer Chemistry, An Introduction*, pp. 330–331, Addison-Wesley Publishing Co., Inc. (1975); Sax, N. I. et al, *Hawley's Condensed Chemical Dictionary*, p. 737, Van Nostrand Reinhold Co., 11th edn. (1987); Allen G. et al., *Comprehensive Polymer Science, The Synthesis, Characterization,*

*Reactions and Applications of Polymers*, Vol. 7, p. 655, Pergammon Press (1989). Preferred melamine formaldehyde resins of the present invention include methylated melamine formaldehyde resins. Such resins are commercially available; and among such commercially available resins is ASTRO MEL M-30 from Astro Industries, Borden Packaging and Industrial Products, Morganton, N.C., a Division of Borden, Inc.

In addition to the melamine formaldehyde resins described above, these binders further include a sulfonic acid or various salts thereof as catalyst. Such catalysts are well known in the art, e.g., methanesulfonic acid and amine sulfonate salt. One such commercially available amine sulfonate salt is ARICEL 100, also available from Astro Industries.

These melamine formaldehyde binders optionally further comprise a urea-formaldehyde resin. Urea-formaldehyde resins are also well known in the art. See, e.g., *Comprehensive Polymer Science*, supra, p: 649; Stevens, M. P., *Polymer Chemistry, An Introduction*, p. 328; and Meyer, B., *Urea-Formaldehyde Resins*, p. 79, Addison-Wesley Publishing Co., Inc. (1979). Urea-formaldehydes are commercially available. One such commercially available urea-formaldehyde is designated FR-014 and is available from Borden Chemical, Columbus, Ohio.

These melamine-formaldehyde binders of the present invention optionally further comprise aliphatic polyurethane. Preferably, this will be a 100% aliphatic polyurethane. Such polyurethanes are commercially available, and include NEOTAX R-9320 available from Zeneca Resins, Wilmington, Mass.

Finally, the melamine-formaldehyde binders of the present invention may further comprise citric acid.

The melamine-formaldehyde binders of the present invention are of three types based upon the resins used: 1) melamine-formaldehyde/urea-formaldehyde; 2) melamine-formaldehyde only; and 3) melamine-formaldehyde/polyurethane.

Preferably, the melamine formaldehyde/urea-formaldehyde resin blend binders contain the following materials: about 60–80 wt % urea-formaldehyde; about 20–40 wt % melamine formaldehyde; about 2–6 wt % amine sulfonate salt; and about 5–10 wt % water. Unless stated otherwise, the stated percent compositions are wt % relative to resin content. An especially preferred formulation comprises about 60 wt % urea-formaldehyde; about 40 wt % methylated melamine-formaldehyde; about 3.7 wt % amine sulfonate salt; and about 7 wt % water. Alternatively, these formulations substitute citric acid and inorganic acids for the amine sulfonate salt. For example, citric acid may be combined with mineral acids at a concentration of 0.4–0.6 wt % of total reactants.

The formulations comprising essentially only the melamine formaldehyde resin are preferably formulated as follows: 94 to about 100 wt % melamine formaldehyde; about 3–6 wt % amine sulfonate salt; about 0.3–0.6 wt % citric acid; and 10–15 wt % water. An especially preferred formulation comprises: about 100 wt % methylated melamine formaldehyde; about 5% amine sulfonate salt; about 0.5 wt % citric acid; and about 13 wt % water.

The formulations comprising melamine-formaldehyde/polyurethane resin blend possess about 50–70 wt % methylated melanime-formaldehyde; about 30–50 wt % polyurethane; and about 3–6% sulfonic acid salt or about 3–7 wt % amine sulfonate salt. Preferably, the polyurethane is a 100% aliphatic polyurethane. An especially preferred formulation comprises: about 50 wt % methylated melamine formaldehyde and about 50 wt % polyurethane; and about 5 wt % mine sulfonate salt or sulfonic acid salt. The binders of the present invention are applied to pads and thoroughly cured in an oven at 450°–540° F. It is essential that the resin binders be thoroughly cured. These melamine-formaldehyde resins show substantially improved durability on exposure to water even over the urea-formaldehyde acrylic binders described above.

While it is contemplated that the most advantageous use of the binders of the present invention is on fiberglass mats or pads, it is further contemplated that these binders may be effectively used on polyester pads fabricated to minimize plugging by particulate matter or otherwise constructed to minimize the obstruction of the free flow of air and water through the pad.

The present invention discloses new coatings for increasing capillarity of glass fibers while simultaneously improving the structural stability of pads made with such coated fibers. The present invention further provides, dimensionally stable, coated glass fiber pads; processes for producing same; and an apparatus and a method for utilizing the coated glass fiber pads of the present invention to cool air. From the above teachings, it is apparent that many modifications and variations of the present invention are possible and the invention can be exploited other than as specifically described above.

I claim:

1. A resin binder formulation for coating evaporative cooler pads consisting essentially of 94 to about 100 parts by weight melamine formaldehyde resin; and about 3–6 parts by weight sulfonic acid salt and about 0.3–0.6 parts by weight citric acid.

2. The resin binder formulation of claim 1 additionally having 10 to 15 parts by weight water.

3. The resin binder formulation of claim 1 consisting of 94 to about 100 parts by weight melamine formaldehyde, about 3 to about 6 parts by weight amine sulfonate salt, about 0.3 to about 0.6 parts by weight citric acid and 10 to 15 parts by, weight water.

4. A resin binder formulation for coating evaporative cooler pads comprising about 20–40 parts by weight melamine formaldehyde resin and about 60–80 parts by weight urea formaldehyde resin; and, relative to 100 parts by weight resin, about 2–6 parts by weight sulfonic acid salt.

5. The resin binder formulation of claim 4 consisting essentially of about 20–40 parts by weight melamine formaldehyde resin and about 60–80 parts by weight urea formaldehyde resin; and, relative to 100 parts by weight resin, about 2–6 parts by weight sulfonic acid salt.

6. A resin binder formulation for coating evaporative cooler pads comprising about 40 parts by weight melamine formaldehyde resin and about 60 parts by weight urea formaldehyde resin; and about 3.7 parts by weight sulfonic acid salt.

7. A resin binder formulation for coating evaporative cooler pads consisting essentially of about 50–70 parts by weight melamine formaldehyde resin and about 30–50 parts by weight aliphatic polyurethane resin; and, relative to 100 parts by weight resin, about 3–6 parts by weight sulfonic acid salt.

8. A resin binder formulation for coating evaporative cooler pads consisting essentially of about 50 parts by weight melamine formaldehyde resin and about 50 parts by weight aliphatic polyurethane resin; and about 5 parts by weight sulfonic acid salt.

* * * * *